United States Patent [19]

Brisebois et al.

[11] Patent Number: 5,892,814

[45] Date of Patent: Apr. 6, 1999

[54] FLEXIBLE, TAPELESS, PERSONALIZED AUTO-ATTENDANT TELEPHONE

[75] Inventors: Michel Joseph A. Brisebois, Chelsea; Robert Barrie Turnbull, Calgary, both of Canada

[73] Assignee: Northern Telecom Limited, Montreal, Canada

[21] Appl. No.: 780,046

[22] Filed: Dec. 23, 1996

Related U.S. Application Data

[60] Provisional application No. 60/009,540, Dec. 29, 1995.

[51] Int. Cl.[6] .................................................. H04M 1/64
[52] U.S. Cl. .......................................... 379/88.24; 379/76
[58] Field of Search ................................... 379/210, 211, 379/85, 73, 74, 88.13, 8.14, 88.15, 88.16, 88.22, 88.23, 88.24, 88.26, 67.1, 76, 212

[56] References Cited

U.S. PATENT DOCUMENTS

| | | | |
|---|---|---|---|
| 5,040,209 | 8/1991 | Greenberg et al. | 379/93.11 |
| 5,062,133 | 10/1991 | Melrose | 379/88.24 |
| 5,163,082 | 11/1992 | Karnowski | 379/88 |
| 5,394,445 | 2/1995 | Ball et al. | 379/140 |
| 5,400,393 | 3/1995 | Knuth et al. | 379/88 |
| 5,434,906 | 7/1995 | Robinson et al. | 379/210 |
| 5,563,935 | 10/1996 | Small | 379/199 |

*Primary Examiner*—Fan S. Tsang
*Attorney, Agent, or Firm*—Thomas N. Vigil

[57] ABSTRACT

A method of operating a subscriber terminal to provide a flexible tapeless personalized auto-attendant telephone by means of measuring ring cadence of an incoming telephone call; and selecting one outgoing message in response to the ring cadence and playing it after a predetermined number of rings. The method also provides for the selection of group greetings and mailboxes automatically, for example, based on CLID and name match in a directory.

8 Claims, 4 Drawing Sheets

FLEXIBLE, TAPELESS, PERSONALIZED AUTO-ATTENDANT TELEPHONE

CROSS-REFERENCE TO RELATED APPLICATION

The present invention is related to previously filed, commonly assigned, U.S. patent application Ser. No. 08/354,658 filed on Dec. 13, 1994 of Turnbull et al. entitled "A METHOD OF OPERATING A MICROPROCESSOR CONTROLLED TELEPHONE SET", and 60/009,540, Dec. 29, 1995, which are incorporated herein by reference.

BACKGROUND OF THE INVENTION

1. Field of the Invention

The present invention relates to telephone subscriber terminals in general, and in particular to processor controlled interactive telephones. More particularly, it relates to personalized telephones configurable to operate as automatic attendants capable of responding to predicted varieties of incoming and outgoing call circumstances. Hardware simplicity is achieved by means of multi-layered microprocessor-based control of a full digital, solid-state, telephone terminal.

2. Background Art

U.S. Pat. No. 4,266,098 granted May 5, 1981 to Novak discloses a device which monitors information contained in incoming telephone calls, and which, when attached to or combined with the circuitry of a telephone receiver, will automatically hold and display the identity of the caller while allowing the telephone bell to be rung only at certain times and/or for certain callers. The caller's identity can be determined by the called party without personally answering the telephone and without revealing to the caller whether the called party is at home or not. It can be used to automatically screen incoming calls and prevent the reception of calls which are unwanted. Accordingly, it can be used to allow unwanted calls to ring the telephone's bell and thus, for example, awaken the user at night, while preventing all unwanted calls from disturbing the called party.

U.S. Pat. No. 4,985,913 granted Jan. 15, 1991 to Shalom et al. discloses a telephone answering machine which stores a plurality of messages and establishes a correspondence between those messages and a plurality of phone numbers. The phone number of a caller is identified and one of the plurality of messages is selected for playback based on the identified phone number and the established correspondence. In a preferred embodiment, the answering machine is microprocessor-based and the correspondence of telephone numbers to messages is stored in a memory table. Messages may be stored either on magnetic media or in semiconductor memory using a signal compression/decompression module where economy dictates in order to reduce the size of the semiconductor memory. Microprocessor control allows economical realization of a full-featured machine.

SUMMARY OF THE INVENTION

The present invention endeavours to provide a flexible telephone terminal that can be configured to respond as a personal automatic telephone attendant, but retaining the user friendly interface of simple telephone terminals and answering machines. It is desirable that the following features be supported by such terminal:

Play All New Messages

Pressing of the [VOICE MAIL] key from idle and/or from a Callers list header, the set plays back all new (not previously listened to) messages automatically in sequence. In this way the user can use the terminal without understanding anything beyond traditional TAD (telephone answering device). During "Play All" the User can FF (fast forward), REW (rewind), SKIP ahead, SKIP back, PAUSE or DELETE. The display screen will show the associated callers list information while the messages are playing.

Play Personal Messages

By Pressing [CALLERS] key, then scrolling through the callers list the user may see all the calls that have been received, new or old. An icon will indicate an attached voice message with that call. Pressing [VOICE MAIL] key in the callers list will play back the voice message associated with the current call. FF, REW, SKIP, PAUSE and DELETE are supported. In this way the user can choose which message to play. The set's screen will show the associated callers list information while the messages are playing. This feature provides mailbox functions, in that messages are associated with the name and or number of the caller.

Generic Greeting

The set is supplied with a canned generic greeting. This greeting is used on all calls when no other greetings are recorded by the user. The user may record their own generic greeting. The user or generic greeting is used when no CLID (calling line identification) info is received or if no name match occurs, i.e.: the set cannot resolve who the call is from. The generic greeting is recorded in an Options list item.

Group Mailbox Greetings

The user can record several group greetings. The group greetings are used when the incoming call number delivered by CLID matches with a directory item and there is a group number associated with that name in the directory. Example: In a family with teens, the parents have a greeting for their group of callers and the teens have a different greeting for their friends. The user assigns groups in the directory. A sub-menu allows the attachment of a group number to each item in the directory. The group number is extracted when the incoming name match occurs. The group number indicates which greeting to use. The group greeting are recorded in an Options list item. The user can elect to assign a "no group" key. In such case, the set will not answer a call from this number and the 'grouped' messages are stored in the associated mailbox for that group.

If the user elects to use none of the advanced features. The set will operate as a conventional TAD. In this case the set will use the factory supplied canned greeting and the user can get single key access to all new messages by using the [VOICE MAIL] key and thus invoking the Play-All-New feature.

Personal Greetings

The user can record personal greetings. The personal greetings are used when the incoming call number delivered by CLID matches with a directory item and there is a personal greeting associated with that name in the directory. Example: The user is expecting a call but will be away from the phone when the call comes. The user can record a specific message for that caller. The user records personal greetings in the directory. A sub menu allows the recording of a personal greeting.

Priority Call

The caller may make their call a priority call (by pressing a designated DTMF key) at some point during the recording. In this case their message will be seen first when the user invokes the Auto-Playback feature or goes into the Caller's list.

Idle Status Messages

The display manager provides idle status messages for Call Forward, Message Waiting, New calls and Ringer Off. Two more idle status messages would warn of Low Battery (where appropriate) and Almost Out of Memory (to prompt the user to delete some old messages). The set will also show the number of new calls with and without voice messages.

Speech Recognition

The use of Speech Recognition technology is a desirable remote access feature.

It will no longer be necessary to use the DTMF keypad as the remote access interface. Rather the user commands the set via spoken words to perform the desired action. Since the set is a personal item or at most used by a small number of people, it will be possible to use speaker dependent voice recognition algorithms. Thee algorithms are readily available and require much less DSP (digital speech processing) power than speaker independent algorithms.

A strategy that can be used is that the user will speak a keyword plus an argument. The set will repeat the keyword as a canned prompt for a confirmation. The set can then proceed to enunciate names (from directory match in the user's voice), numbers (synthesized from canned prompts of the numbers in the directory or callers list), envelope information (synthesised from canned prompts) plus read back stored messages as recorded.

The auto-attendant (AA) mode of the present invention provides a method of operating a subscriber terminal to provide a flexible tapeless personalized auto-attendant telephone by means of measuring ring cadence of an incoming telephone call; and selecting one outgoing message in response to the ring cadence and playing it after a predetermined number of rings.

The method of the present invention further provides for the selection of group greetings and mailboxes automatically, for example, based on CLID and name match in a directory.

BRIEF DESCRIPTION OF THE DRAWINGS

The preferred embodiments of the present invention will now be described in detail in conjunction with the drawings, in which.

DETAILED DESCRIPTION OF THE PREFERRED EMBODIMENTS

Figure 1:
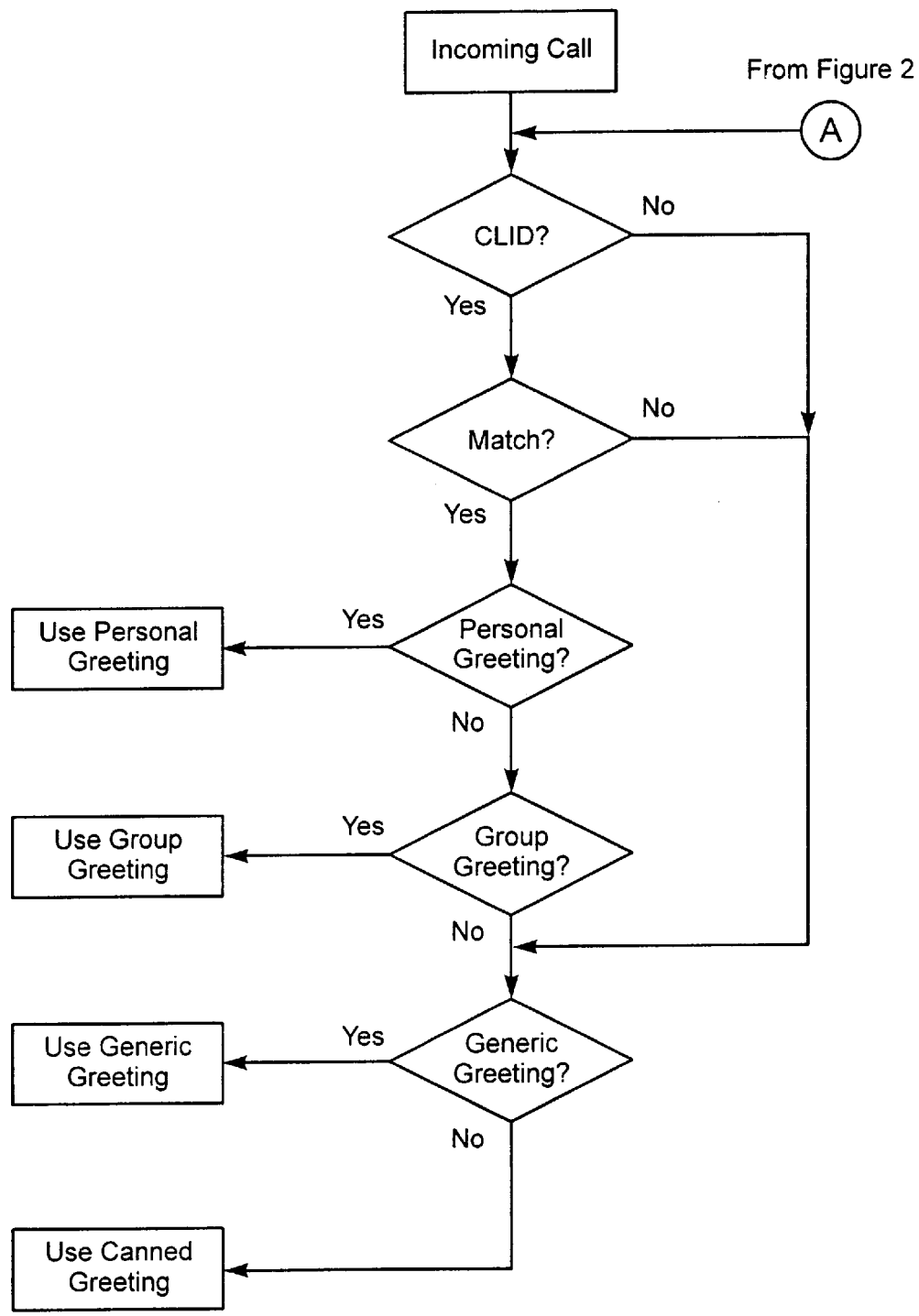
FIG. 1 is a simple flow-chart illustrating prior art implementation of a telephone answering device (TAD) with limited flexibility.
Figure 2:
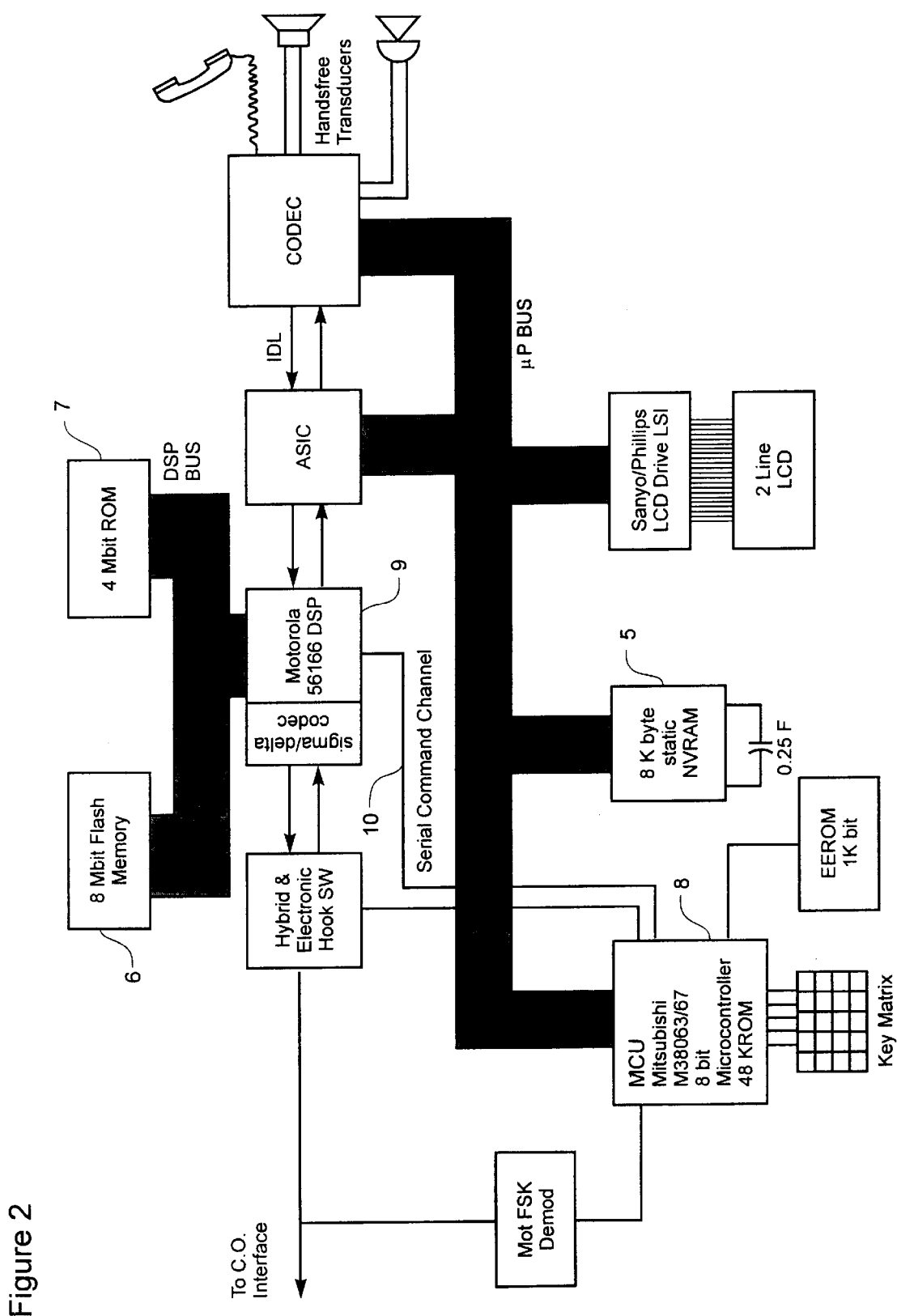
FIG. 2 is a block schematic of the TAD according to the present invention.
Figure 3:
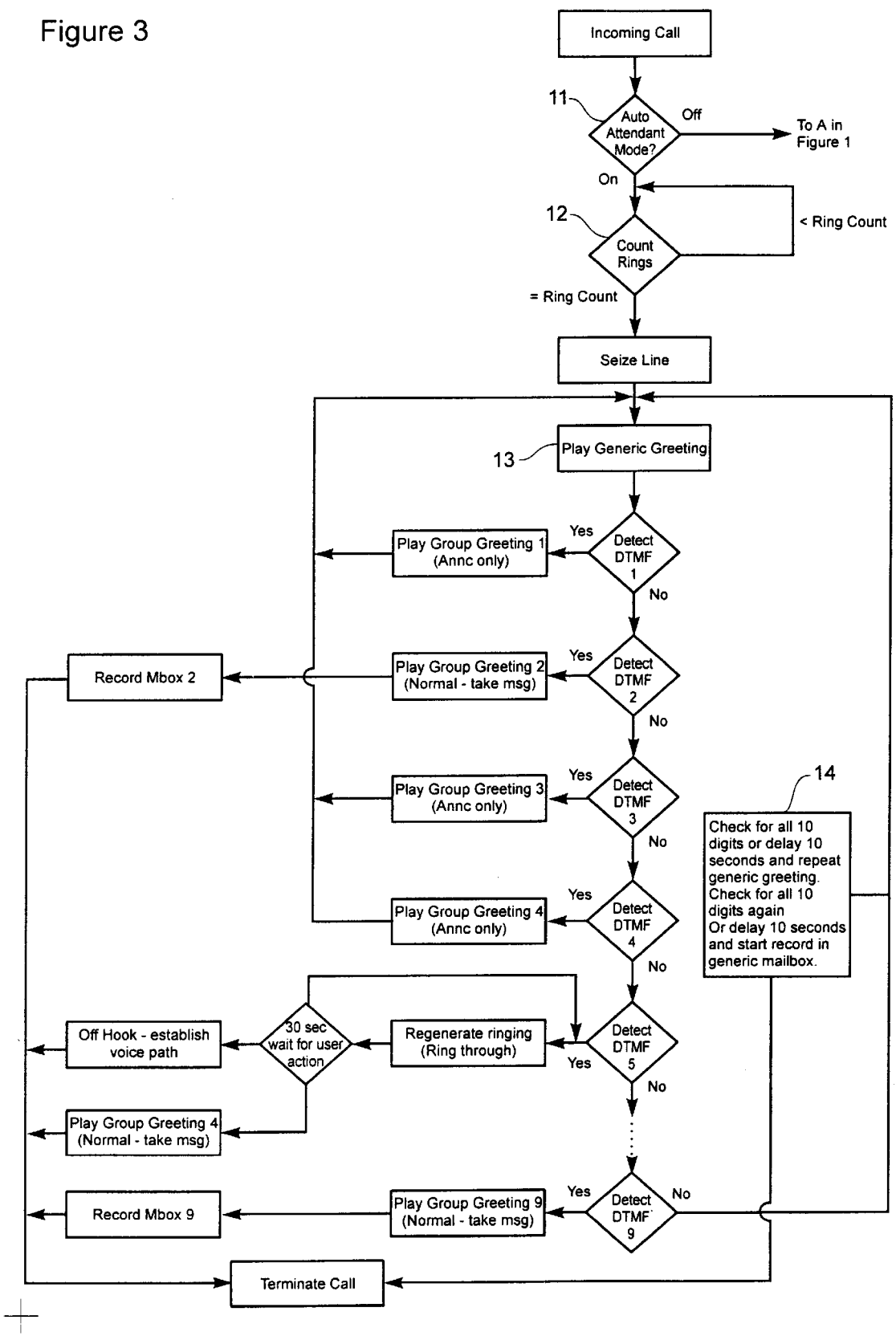
FIG. 3 is a flow-chart of the TAD according to the present invention.

FIG. 1 shows a self-explanatory flow-chart illustrating prior art use of CLID in a TAD to provide somewhat tailored greetings to incoming calls. While FIGS. 2 and 3 show a block schematic of the hardware, and a flow-chart illustrating the present invention, respectively.

The flexible nature of memory control used in this TAD system yields some unique and useful features. In general, the random record and playback capabilities of the MCU/DSP/Flash Memory/Voice ROM system as well as the system of tagging each recording provides this flexibility. The TAD set takes advantage of this flexibility to provide five unique features that are not offered in other answering machines, even digital ones:

Voice Announcement

Auto-Attendant

Custoinizable OGM

Bilingual or Business/Personal (pseudo 2-line answering machine)

Mailbox Answering System.

With reference to FIGS. 2 and 3 of the drawings, the answering system is microprocessor based. An 8 Kbyte static RAM 5 stores a Directory Callers List, Greetings List, Redial List. An 8 Mbit flash memory 6 stores compressed voice recordings while a 4 Mbit ROM 7 stores preprogrammed voice recordings. The lists could be stored in the flash as well.

The static RAM 5 is connected to and controlled by the main MCU 8. The static RAM 5 is supported by a 0.25 Farad capacitor in the event of power failure. Thus it is termed non-volatile RAM. The lists have varying capabilities and dimensions. In general, the lists are capable of storing several hundred 16 character names in ASCII form, 24 digit numbers in nibble packed binary form, time & date, various status flags and one or more tags to voice recordings. The tags are 2-byte pointers into a table maintained by the DSP 9 in Flash memory.

The DSP 9 has the 8 Mbit flash memory 6 connected to it that is used for voice storage. A flash memory is by nature non-volatile. The voice recordings are stored as a compressed digital representation of the actual speech. The speech compress/decompress algorithm (vocoder) is Motorola's proprietary VSELP 4.2, but other voice coders could be used. The digitized recordings are stored in frames. Each frame is 32 ms. 2 second long groups of frames, blocks are stored sequentially in flash. Each block of frames links to the next block of frames. Therefore every voice recording consists of many linked 2 second long blocks. The blocks of frames do not have to be in order inside the flash. Each block has a pointer to the start of the next block belonging to that recording. Thus the 2 second long blocks of frames form a linked list structure inside the flash. The DSP 9 maintains a table that relates 'tags' or pointers to the start address in flash of each recording as well as pointers to unused memory. Any recording in the flash can be accessed at any time by referring to its tag. The DSP 9 will use the tag as an index into a pointer table to find the start address of the message in the flash memory 6.

Whenever the user wants to make a recording, whether voice tag, general greeting, personal greeting, group greeting or incoming message, the main MCU 8 sends a record command to the DSP 9. The DSP 9 returns a "2-byte tag number" that is used to identify this particular recording as long as it exists. The tag is added to the Directory entries, Callers List entries or Greetings List entries and serves as a pointer to the group greeting, voice tag, personal greeting or incoming message. The tag is essentially an index into the DSPs 9 pointer table in the flash memory 6.

It is important that the tag numbers never change for the life of the recording as the directory, callers etc. are stored in a separate memory from the actual recordings.

The separate memories are controlled by separate computers. The main MCU 8 maintains the lists in the 8 Kbyte static RAM 5 while the DSP 9 maintains the voice recordings in the 8 Mbit flash memory 6).

The DSP 9 maintains a pointer table inside the flash memory 6 that relates the tag to the start location in the flash memory 6 of that recording. The tag and pointer contents are maintained as long as the recording exists. When the recording is erased or the item in the list that contains a recording's tag is deleted the tag and pointer address is erased by the DSP 9.

Furthermore, checks have to be made each time the set starts up that the tags in the NVRAM 5 actually match the voice recordings inside the flash memory 6. Also, since the NVRAM 5 deteriorates in 72 hours when the set is unpowered and the flash memory 6 is permanent, when list items are no longer valid, the associated voice recordings must be removed from flash memory 6.

The MCU 8 firmware has various layered routines to send commands to the DSP 9, receive status from the DSP 9 etc . . . MCU 8 to DSP 9 communications take place over a synchronous serial link 10 between the two chips.

The various modes of operation of the TAD system will now be described with reference to FIGS. 3 and 4.

Auto-Attendant (AA) Mode

The auto attendant mode changes the function of voice mailboxes to provide a simple simulation of a large IVR (Independent Voice Recording) system that a small or home business could use to give customized service to callers.

In AA mode 11 the phone answers on the correct number of rings 12 and plays either the general greeting 13 or special greeting, depending on measured ring cadence (see bilingual operation below). This general greeting 13 should be recorded in such a way as to offer the caller choices. For example:

"Thank you for calling Big Mountain Ski Resort. If you would like to know the ski conditions press 1, If you would like to know our operating hours press 2, If you would like to know the lift tickets prices press 3, If you would like to make a reservation at the hotel press 4. If you would like to record your comment or suggestions press 5"

This greeting 13 is played regardless of CLID if the AA mode is enabled and is played once followed by a 10 second wait after which it is played again. The caller may think about their selection and press a DTMF key (1 to 9) any time. If no respond is detected in 10 seconds 14 the general greeting is played again. If no response is detected in 10 seconds again, the system beeps, goes into record and will attach this message to the general mailbox.

To allow a flexibility of responses, based the selection the caller makes (1 to 9) the mailboxes are used for recording and directing the individual responses. To this end there can be three basic types of responses. Each mailbox must be programmed to give the appropriate response when selected by the caller.

All group greetings/mailboxes can be selected to be either:

i) Normal - Plays the group greeting belonging to that mailbox, takes a message and hangs up. The message is attached to that mailbox.

ii) Announce - Plays the group greeting belonging to that mailbox and returns to the generic greeting.

iii) Ring Through - Regenerates ringing on the set's speaker and ringback to the caller. If the handset is picked up the set establishes a normal voice path. If the handset is not picked up after 30 seconds the group greeting for that mailbox is played and a message is taken that is attached to that mailbox.

Selection of the group greeting/mailbox type can be made in the Greetings List when recording the greetings or after recording by using the edit sequence.

Continuing with the above ski resort example the group greetings could be recorded as follows:

Group greeting/Mailbox 1: - admin as Announce

"The snow conditions today are excellent. 10 cm new powder overnight.

Highs today −10. Come out and enjoy Big Mountain."

Group greeting/Mailbox 2: - admin as Announce "Big Mountain is open every weekend from 9:00 am to 4:00 pm. Monday to Thursday 9:00 am to 3:00 pm. Fridays night skiing until 9:00 pm."

Group greeting/Mailbox 3 - admin as Announce

"Adult lift ticket prices are $25.00 mid week and $30.00 weekends. Student prices are $20.00 mid week and $25.00 weekends."

Group greeting/Mailbox 4 - admin as Ring Through

"Were sorry, no is available to take your call right now. Please leave your name and phone number and we'll call you right back."

Group greeting/Mailbox 5 - admin as Normal

"Please record your comments or suggestions about how we can improve our resort."

Thus the caller is directed by the general greeting as to the choices/responses offered. The user can select the response by pressing DTMF keys on his set. The answering system monitors the DTMF and branches to the selected mailbox. The mailbox then responds as programmed: Either play greeting and return to general greeting, play greeting and go into record then terminate or regenerate ringback and ringing.

In the example above the set takes care of the many routine questions automatically thus relieving the staff of this duty. if desired the caller can "ring-through" to an operator.

Bilingual Mode

If the user subscribes to "Teen Service" or "Distinctive Ringing" service from their telephone company then they are issued two phone numbers for their one line. The second number rings with a difference cadence than the first number so the user can identify in advance what number the caller has called.

The telephone set is capable of measuring the ring cadence during the ringing portion of the call. If the set has measured the standard ringing pattern of 2 sec on 4 sec off then it answers with the General Greeting and any message taken is attached to the General Mailbox. If the set has measured the non-standard ringing pattern and if the user has recorded a greeting in the Special mailbox then the set will answer with the Special Greeting and any message taken will be attached to the Special Mailbox.

Thus the user can record two greetings, for example: The General Greeting could be in English and the Special Greeting could be in French. He could publish two phone numbers, one for English and one for French. Thus all French speaking callers would get customized greetings in French while all English speaking callers would get customized greetings in English.

This feature can also be used for home office by recording their personal greeting as the General Greeting and their business greeting as the Special Greeting. Personal and business calls would be automatically sorted by Special or General mailbox.

This bilingual or pseudo two-line feature can be combined with Auto Attendant if desired.

Mailbox Based Home Answering Machine

The mailbox access based on DTMF keys pressed by the caller is active even if auto attendant is turned off. Thus the digital answering machine can provide very flexible operation.

Group Greetings and mailboxes can be selected automatically based on CLID and name match in the Directory. Thus every member of a household can have a greeting for their associates in their own words and voice.

In addition special information can be dispersed at the request of the caller if they press DTMF keys during the greeting. For example: In a household there may be 3 members Bill, Sue and Jim. Each one records their own greeting and thus has their own mailbox. CLID matched calls will automatically route the messages to the correct mailboxes.

If a non-recognized call comes in the general greeting is played. It can be recorded to say:

"To leave a message for Sue press 1, to leave a message for Bill press2, to leave a message for Jim press 3. If you are interested in the used car we are advertising press 4."

Mailboxes 1, 2 and 3 should be Sue, Bill and Jim's group greetings. In this way callers can manually route their messages to the correct mailboxes. This is useful if they're calling from "unknown" numbers or any number that is not their own and therefore unlikely to be in the directory.

Mailbox 4 could be recorded as an Announce type mailbox containing an advertisement for the car:

"Our 1988 red Honda Civic is for sale. It has new tires, a recent tune-up, 100,000 Km & no rust. If you would like to make an appointment to see it press 6."

Mailbox 6 could be recorded as a Normal type mailbox

"The Honda is available for viewing between 6:00 pm and 9:00 pm weeknights and all day Saturday and Sunday. If you would like to see it please leave your number at the tone and we'll call you back".

Figure 4:
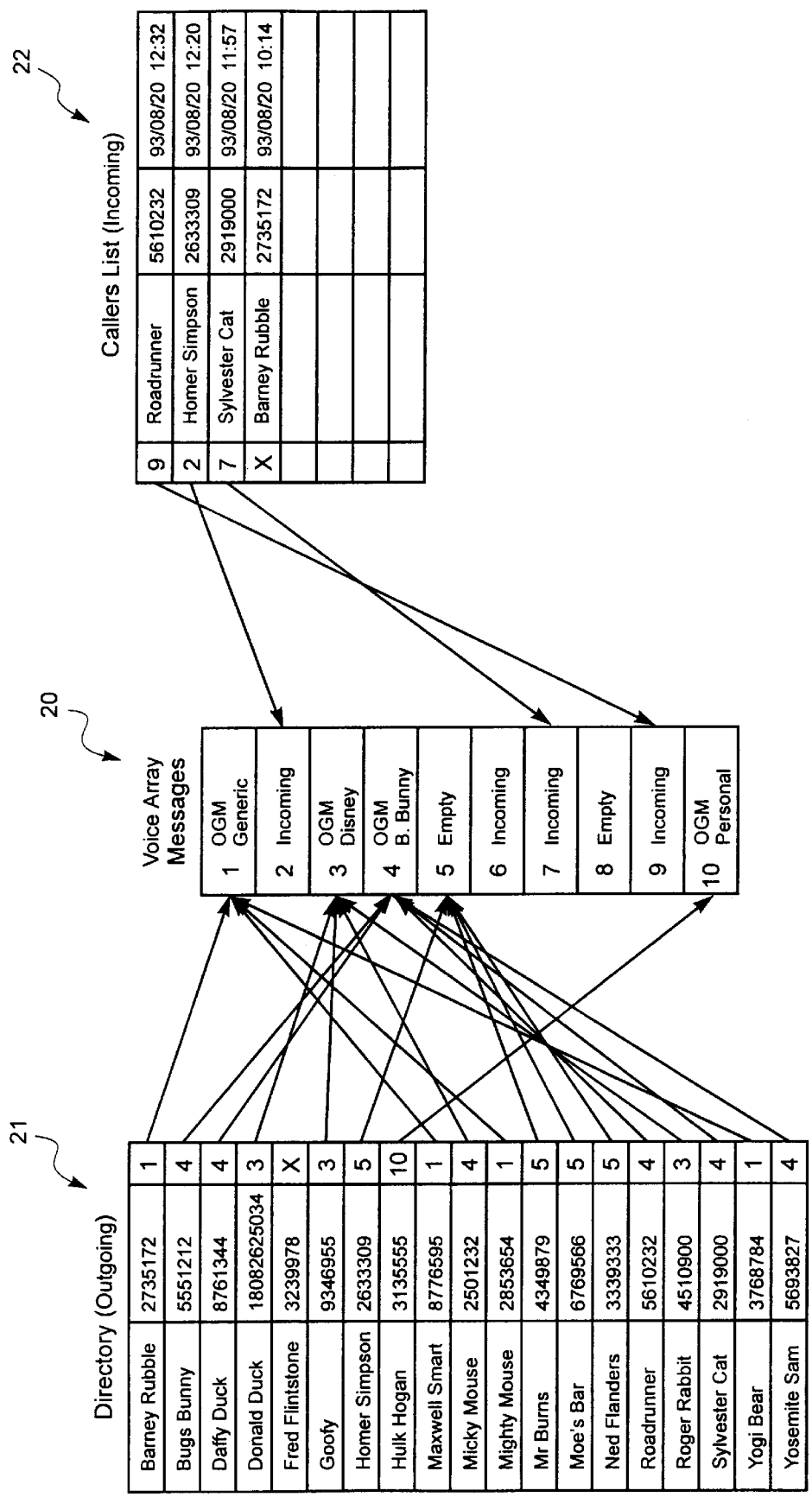
FIG. 4 is an illustration depicting a preferred scheme for recording messages in a voice array according to an aspect of the present invention.

FIG. 4 of the drawings shows the preferred implementation of a voice array memory 20 for messages (both outgoing (OGM), i.e. greetings and incoming) and an outgoing number directory 21 as well as an incoming callers list 22. This implementation permits the efficient sharing of the more costly voice memory for both outgoing greetings and incoming messages. The OGM messages previously stored in the voice array 20 by the user and, as may be seen, one OGM may be used to greet more than one incoming caller once identified by the CLID feature. The callers list 22 contains, in addition to the calling number and time of call, the segment in the voice array 20 in which an associated messages is recorded, if any.

What is claimed is:

1. A method of operating a subscriber terminal telephone to provide a flexible tapeless personalized auto-attendant service, comprising:

(a) measuring ring cadence of an incoming telephone call;
    (b) causing said telephone when in auto-attendant mode to always provide a generic outgoing message (OGM) in response to the incoming telephone call;
    (c) answering the incoming telephone call after ringing said telephone for a predetermined number of rings;
    (d) selecting one predetermined greeting OGM in response to a predetermined dual-tone multi-frequency (DTMF) signal and playing it;
    (e) regenerating ringing in said telephone for a predetermined period in response to another predetermined DTMF signal after said playing step; and
    (f) providing an OGM, for message recording, only after said predetermined period in step (e) has ended without an answer to ringing in step (e).

2. The method as defined in claim 1, further comprising the step of storing an incoming message in a memory location associated with a given OGM.

3. The method as defined in claim 1, wherein said generic OGM is repeated at least once in default of DTMF signals in steps (d) and (e).

4. The method as defined in claim 3, wherein at least one predetermined greeting OGM is an announcement-only OGM.

5. A flexible tapeless personalized auto-attendant subscriber terminal telephone comprising:

(a) means for measuring ring cadence of an incoming call;
    (b) means for providing a generic outgoing message (OGM) in response to the incoming telephone call;
    (c) means for answering the incoming telephone call after ringing said telephone for a predetermined number of rings;
    (d) means for selecting one of a plurality of predetermined greeting OGM in response to a predetermined dual-tone multi-frequency (DTMF) signal and means for playing the greeting OGM;
    (e) means for regenerating ringing in the subscriber terminal telephone for a predetermined period in response to another predetermined DTMF signal after playing the greeting OGM; and
    (f) means for providing an OGM for message recording after said predetermined period has ended and regenerated ringing has not been answered.

6. The subscriber terminal telephone defined in claim 5, further comprising a plurality of memory locations for storing incoming messages associated with a plurality of outgoing messages.

7. The subscriber terminal telephone defined in claim 5, further comprising means for repeating said generic OGM in default of DTMF signals.

8. The subscriber terminal telephone defined in claim 7, further comprising means for providing an announcement-only OGM without an associated memory location for storing an incoming message.

* * * * *